United States Patent
Strauven et al.

(10) Patent No.: US 7,374,840 B1
(45) Date of Patent: May 20, 2008

(54) CENTRIFUGALLY ATOMIZED ZINC ALLOY POWDER FOR ALKALINE BATTERIES

(75) Inventors: Yvan Strauven, Neepelt (BE); Bruno Gay, Brussels (BE)

(73) Assignee: Umicore, Olen (BE)

( * ) Notice: Subject to any disclaimer, the term of this patent is extended or adjusted under 35 U.S.C. 154(b) by 0 days.

(21) Appl. No.: 09/936,531

(22) PCT Filed: Feb. 3, 2000

(86) PCT No.: PCT/EP00/00932

§ 371 (c)(1),
(2), (4) Date: Sep. 11, 2001

(87) PCT Pub. No.: WO00/48260

PCT Pub. Date: Aug. 17, 2000

(30) Foreign Application Priority Data

Feb. 9, 1999 (EP) .................................. 99200353

(51) Int. Cl.
*H01M 4/42* (2006.01)
*B22F 9/10* (2006.01)
*C22C 18/00* (2006.01)

(52) U.S. Cl. ....................... 429/229; 420/513; 420/514; 75/333; 75/334

(58) Field of Classification Search ................ 429/229, 429/230; 420/513, 514; 75/333, 334, 255
See application file for complete search history.

(56) References Cited

U.S. PATENT DOCUMENTS 5,917,113 A * 6/1999 Suzuki .................... 75/338

6,472,103 B1 * 10/2002 Durkot et al. ............. 429/229

FOREIGN PATENT DOCUMENTS

| JP | 58-217608 | * 12/1983 |
| JP | 61-064074 | * 4/1986 |
| JP | 01-052379 | * 2/1989 |
| WO | WO 94/19502 | * 9/1994 |
| WO | WO99/07030 | 2/1999 |

OTHER PUBLICATIONS

Certified translation of JP 1-52379 (64-52379), Feb. 28, 1989.*
Handbook of Batteries, McGraw-Hill, 1995 (pp. 10.5-10.6).

* cited by examiner

*Primary Examiner*—Jonathan Crepeau
(74) *Attorney, Agent, or Firm*—Mishrilal Jain, Esq.; Nirmel & Assoc.

(57) ABSTRACT

This invention relates to centrifugal atomized zinc alloy powders for alkaline batteries consisting of (a) 0.005-2% by weight of indium, and 0.005-0.2% by weight of either one of Al and Bi, or (b) 0.005-2% by weight of indium, and 0.005-0.2% by weight of Bi, and 0.001-0.5% of either one or both of Al and Ca, or (c) 0.005-2% by weight of either one or both of Bi and Al, and 0-0.5% by weight of Pb, the remainder being zinc. The powder is obtained by centrifugal atomisation in a protective atmosphere, where the oxygen content is less than 4% by volume. The resistance to corrosion in the electrolyte of the battery, especially after partial discharge, is markedly better than when the same alloys are prepared by the traditional production process. The capacity of batteries containing these powders is very good.

11 Claims, No Drawings

CENTRIFUGALLY ATOMIZED ZINC ALLOY POWDER FOR ALKALINE BATTERIES

This invention relates to centrifugal atomized zinc alloy powders for alkaline batteries.

Zinc alloy powders are used as an ingredient of the anode active material of alkaline batteries. Zinc alloy powders containing one or more elements selected from In, Bi, Al, Ca and Pb, are known from U.S. Pat. No. 5,082,622 and WO 94/19502. Such alloys are normally prepared by traditional powder manufacturing techniques, such as allowing the molten alloy to flow away in a jet of compressed air. The use of a protective atmosphere in such gas jet atomisation process is possible, but quite expensive because of the high flow rate needed. Powders which are manufactured by compressed air atomisation do not always have an acceptable resistance to corrosion in the electrolyte of the battery, especially after partial discharge of the latter. A well-known way of dealing with a low resistance to corrosion is by adding certain amounts of organic or inorganic products. An example of an organic product is polyethylene glycol. However this procedure also has some disadvantages, e.g. the battery capacity could be decreased.

Centrifugal atomisation is a method in which molten metal is poured from a nozzle on a high velocity rotating plate, a cup or a disk with a predetermined shape whereby the metal is disintegrated by centrifugal force. The above cited documents merely mention that the powders can also be manufactured by centrifugal atomisation without specifying any working condition. In these documents the particular effects of using centrifugal atomized powders are not investigated.

According to the invention, a zinc alloy powder prepared by centrifugal atomisation in a protective atmosphere with a reduced oxygen content has a better resistance to corrosion than a powder prepared by atomisation in a stream of air. Moreover, unacceptably low corrosion resistance values of some of the above mentioned zinc alloy powders prepared by atomisation in air are turned into acceptable values when the same alloys are prepared by centrifugal atomisation in said protective atmosphere. The use of organic and inorganic corrosion inhibitors can be limited, or even eliminated. The capacity of batteries containing powders according to the invention is good. The production method is economically sound, because the consumption of gas in the protective atmosphere is very low.

The alloy powder of the invention consists of either (a) 0.005-2%, and preferably 0.01-2% by weight of indium; and 0.005-0.2%, preferably 0.01-0.2% by weight of either one of Al and Bi, or (b) 0.005-2% by weight of indium; and 0.0054-0.2%, preferably 0.01-0.2% by weight of Bi; and 0.001-0.5%, preferably 0.003-0.5% of either one or both of Al and Ca, or (c) 0.005-2%, and preferably 0.01-2% by weight of either one or both of Bi and Al, and in each case 0-0.5% by weight of Pb, the remainder being zinc. By zinc is meant here and in the following thermally or electrolytically refined zinc (Special High Grade). In SHG zinc, the Pb content is normally limited to less than 30 ppm. For economical reasons the indium content can be limited to 5000 ppm, or even to 1000 ppm.

The powder is prepared by centrifugal atomisation, characterized in that this atomising process is performed in a protective atmosphere, mainly consisting of inert gasses, which controls the oxidation. More particularly, the oxygen content in the atmosphere is less than 4% by volume.

In order to prevent excessive oxidation, the oxygen content is limited to 4%, and preferably less than or equal to 3.5%. On the other hand, a minimum amount of oxygen can be useful to control the shape of the solidified droplets. Also, too low oxygen contents imply a reduction of the capacity of the battery. For these reasons the oxygen content is preferably greater than 0%, and especially greater than or equal to 0.2%.

The rotating disk of the atomizer is made out of materials like alumina, carbon or fused silica, which can also be coated to prevent oxidation or occurrence of accretion.

Another object of the invention is a process to manufacture zinc alloy powders comprising the step of centrifugally atomising the zinc alloys mentioned above and characterized in that the centrifugal atomising process is performed in a protective atmosphere, where the oxygen content is less than 4% by volume, and preferably greater than 0% by volume. Most preferably the oxygen content is between 0.2% and 3.5% by volume.

The applicant has found that when the powders described previously are prepared by a centrifugal atomising process in the above described protective atmosphere, they are consistently showing a better resistance to corrosion in the electrolyte of the battery, after partial discharge of the latter, compared to powders with identical compositions and prepared by air jet atomisation. The resistance to corrosion and the capacity of the powders according to the compositions of the invention, and prepared by centrifugal atomisation, are all recommendable for practical use in alkaline batteries. In a further experiment it is shown that the capacity of a battery using powders prepared by centrifugal atomisation according to the invention is better than when powders are used prepared by gas jet atomisation in a protected atmosphere with the same oxygen content.

In case the desired powder contains additives which can be cemented (for instance In), then another way to produce the powder consists in preparing a powder with the additives which cannot be cemented and optionally with a part of the additives which can be cemented according to the above mentioned method of centrifugal atomisation and making an anode from the thus obtained powder. That anode is introduced in the battery and the additives which can be cemented, are either added to the electrolyte of the battery, from which they cement on the powder of the anode, or they are cemented before the introduction in the battery. It is also possible to obtain powders for alkaline batteries by mixing a powder with a given composition and produced in a traditional way, such as atomisation in a stream of air, with a powder which was prepared by centrifugal atomisation in a protective atmosphere, according to the invention.

This invention relates not only to a powder such as it is introduced in the battery, but also to a powder such as it is present in the battery, and which consists entirely or partly of powder prepared by centrifugal atomisation, the remainder being prepared by traditional powder manufacturing techniques.

The powder is suitable for use in any type of battery, such as LR6, LR14, LR20.

Here, the following should be noted: Centrifugal atomized zinc alloy powders are mentioned in "*Atomization of melts for Powder Production and Spray Deposition*", by A. J. Yule and J. J. Dunkley; Clarendon Press, Oxford; 1994; pp. 223-224. According to Yule, centrifugal atomisation is used as it gives a very closely controlled particle size distribution, which renders the powder production more economical. It is also possible, by control of the atmosphere inside the atomizer, to control the particle shape and hence the surface area and apparent density of the powder, both of which are significant for battery applications. This publication however does not mention which alloys can be exploited beneficially for this application, and neither is described what the controlled atmosphere inside the atomizer should be. Also it does not describe if and in what way the process of centrifugal atomisation has an influence on the characteristics of the batteries prepared with these powders.

tained for 7 days at 71° C. The resulting gas production is expressed as ml of gas per battery. Also the volume expansion of a partially discharged anode is measured after 24 hrs at 71° C., and the volume increase is expressed as a percentage of the original volume. This measuring technique is an out-of-cell test described in U.S. Pat. No. 5,364,715. Both in cell and out-of-cell gassings are a measure for the gassing after partial discharge.

The results of these tests are compared with results on traditional air atomized powders with the same chemical composition. In the examples, all powders are sieved on 500 micron to take away the very course particles. The results of Experiment 1 are summarized in Table 1.

TABLE 1 experimental results of centrifugally atomised powders vs. powders atomised in a stream of air

| Ex. No. | Alloy powder additives (ppm) | | | | (*) | $O_2$ % by Vol | Volume expansion (%) | Gassing after partial discharge 4½ hrs, 2 Ohm (ml) | Gassing after partial discharge 1 hr, 2 Ohm (ml) |
|---|---|---|---|---|---|---|---|---|---|
| | In | Bi | Ca | Al | | | | | |
| (1) | 150 | 230 | — | — | C | 0.4 | 3.4 | 4.63 | 1.95 |
| (2) | 500 | 100 | — | 100 | C | 0.4 | 1.7 | 2.07 | 1.5 |
| (3) | 200 | 180 | — | 70 | C | 0.4 | 3.6 | 3.67 | 1.7 |
| (4) | 250 | 250 | 150 | — | C | 0.4 | 3.1 | 3.57 | 1.37 |
| (5) | — | 250 | — | — | C | 0.4 | 6.5 | 8.05 | 3.12 |
| (6) | 2000 | 500 | — | — | C | 0.4 | 3.4 | 2.38 | 1.83 |
| (7) | 200 | — | — | 70 | C | 1.0 | 4.1 | 4.20 | na |
| (8) | — | 200 | — | 70 | C | 0.8 | 2.1 | 4.03 | na |
| (9) | 200 | 100 | 180 | 70 | C | 3.3 | 1.5 | 2.33 | na |
| (10) | 150 | 230 | — | — | T | air | 28.4 | 10.65 | 13.63 |
| (11) | 500 | 100 | — | 100 | T | air | 5.6 | 2.5 | 2.3 |
| (12) | 200 | 180 | — | 70 | T | air | 5.1 | 4 | 1.7 |
| (13) | 250 | 250 | 150 | — | T | air | 10.2 | 4.08 | 6.75 |
| (14) | — | 250 | — | — | T | air | 19.8 | 9.23 | 12.13 |
| (15) | 2000 | 500 | — | — | T | air | 41.9 | 12.7 | 19.58 |
| (16) | 200 | — | — | 70 | T | air | 43.6 | 19.53 | na |
| (17) | — | 200 | — | 70 | T | air | 4.5 | 6.13 | na |
| (18) | 200 | 100 | 180 | 70 | T | air | 2.4 | 4.07 | na |
| (19) | 500 | 5000 | — | 70 | T | air | 26.2 | 16.7 | 13.5 |
| (20) | 500 | 5000 | — | 70 | C | 0.4 | 30.1 | 13.5 | 6.37 |
| (21) | 600 | — | — | — | T | air | 87.6 | 52.63 | (**) |
| (22) | 600 | — | — | — | C | 0.4 | 42.1 | 25.07 | 22.43 |
| (23) | 900 | — | — | — | C | 0.4 | 25.9 | 21.38 | 15.9 |
| (24) | 40 | 40 | — | — | C | 0.4 | 28.5 | 11.63 | 8.57 |

(*): 'C': centrifugal atomized powder; 'T': powder preparation by traditional air jet atomisation
(**): Leakage occurred, which indicates that gassing was excessive and unacceptable.
na: not available

EXPERIMENT 1

In an example of producing the powder of the invention, the powders are prepared by adding the desired quantities of the alloying elements to molten zinc, which is homogenized by stirring at elevated temperature. The process of centrifugal atomisation is carried out as follows: about 150 kg of alloyed zinc is melted in a protective atmosphere at 480° C. and poured on a rotating disk. The rotating disk is made of carbon, and placed 25 mm below the ejecting nozzle concentrically, 1.5 m above the bottom at the centre of the atomising chamber. The atomising chamber is filled with nitrogen and 0.4% to 3.3% of oxygen (see Table 1). The rotation speed is about 5000 rpm, the diameter of the disk is 170 mm and the flow rate of molten metal is about 530 kg/hr.

With the alloy powders batteries of the LR14-type are produced. These batteries are discharged over 2 Ohm for 1 hr or for 4½ hrs. Subsequently one determines the quantity of hydrogen which is evolved when the batteries are maintained for 7 days at 71° C.

For the volume expansion, a value of less than 12% is considered to be very good, preferably the expansion should be less than 8%.

The gassing after partial discharge is good for values less than 12 ml, and preferably less than 8 ml, for both the gassing tests after 4½ hrs or 1 hr of discharge.

Comparison of Examples No. (1)-(9) with Examples No. (10)-(18) shows that the powders according to the invention have better corrosion resistance and expansion parameters than traditionally prepared powders. The compositions of the Examples No. (10), (14), (15) and (16), which do not yield acceptable results when prepared in the traditional way, have excellent results when prepared according to the invention, as shown in Examples No. (1), (5), (6) and (7). Examples No. (20), (22)-(24) show that centrifugal atomisation is not yielding satisfactory results for zinc powders consisting of alloys other than the compositions claimed in the invention.

It has been noticed that the powder capacity of the powders prepared by centrifugal atomisation in this experiment and used in LR-6 batteries is varying between 90% and 110% as compared to a standard powder used in these batteries nowadays, for instance the powder according to Example No. (12) above.

EXPERIMENT 2

In Experiment 2 a comparison is made between powders which were made exclusively by centrifugal atomisation but with different oxygen contents in the protective atmosphere. The other process parameters and the test procedure of the LR-14 batteries using the powders are identical to Experiment 1. The results are presented in Table 2.

TABLE 2

Volume expansion of different centrifugally atomised powders

| Ex. No. | Alloy powder additives (ppm) | | | | | $O_2$ % by Volume | Volume expansion (%) |
|---|---|---|---|---|---|---|---|
| | In | Bi | Ca | Al | Pb | | |
| (25) | 200 | 100 | — | 100 | 54 | 2.5 | 3.0 |
| (26) | 150 | 150 | — | — | 40 | 2.0 | 5.6 |
| (27) | 200 | 100 | — | 100 | 54 | 5 | 12.3 |
| (28) | 150 | 150 | — | — | 40 | air | 23.6 |

The results of this experiment are the following:
when the oxygen content in the protective atmosphere of the centrifugal atomising chamber is outside the limits of this invention, then the volume expansion measured becomes inacceptable, as is shown when comparing Examples No. (25) and (26), with (27) and (28).

EXPERIMENT 3

In Experiment 3 powders prepared by traditional gas jet atomisation under a protective atmosphere are compared with powders prepared by centrifugal atomisation under the same protective atmosphere. The procedure for the centrifugal atomisation is identical to the procedure in Experiment 1. The powders were tested in LR-6 batteries, which were discharged at a constant current of 1000 mA. A standard air atomised powder used in LR-6 batteries nowadays, i.e. the powder Example No. (12) from Table 1, was used as a reference. The discharge time to a residual voltage of 1.0 V for the different powders is expressed as a percentage of the discharge time to 1.0 V for the reference powder. The discharge time is a measure which expresses the capacity of the tested batteries. The results are given in Table 3 below.

TABLE 3

Discharge time of batteries prepared with centrifugally atomised vs. gas jet atomised powders

| Ex. No. | Alloy powder additives (ppm) | | | | | (***) | $O_2$ % by Volume | Discharge time (%) |
|---|---|---|---|---|---|---|---|---|
| | In | Bi | Ca | Al | Pb | | | |
| (29) | 160 | 230 | — | — | 46 | C | 2.35 | 102 |
| (30) | 160 | 230 | — | — | 46 | C | 0.6 | 90 |
| (31) | 160 | 230 | — | — | 46 | G | 2.35 | 87 |
| (32) | 160 | 230 | — | — | 46 | G | 0.6 | 61 |

(***): 'C': centrifugal atomized powder; 'G': powder preparation by gas jet atomisation The results of Experiment 3 are the following:
both discharge times for centrifugally atomised powders are within the claimed range of 90-110% of the discharge time of the standard powder. 2.35% $O_2$ yields a better capacity than 0.6% $O_2$.
both discharge times for the gas atomised powder are significantly lower than the discharge times of powders atomised centrifugally in gas with the same composition of the powder and of the protective atmosphere, and are less than 90%.

In Table 5 additional results for powders prepared by centrifugal atomisation according to the invention are given. They have been prepared and tested following the procedure of Experiment 1.

TABLE 5

Volume expansion of different centrifugally atomised powders

| Ex. No. | Alloy powder additives (ppm) | | | | | $O_2$ % by Volume | Volume expansion (%) |
|---|---|---|---|---|---|---|---|
| | In | Bi | Ca | Al | Pb | | |
| (33) | 250 | 250 | 150 | — | — | 0.6 | 3.3 |
| (34) | 500 | 110 | — | 35 | — | 0.6 | 1.9 |
| (35) | 500 | 110 | — | 35 | — | 1.35 | 2.5 |
| (36) | 500 | 110 | — | 35 | — | 1.6 | 2.1 |
| (37) | 500 | 110 | — | 35 | — | 2.1 | 6.7 |
| (38) | 500 | 110 | — | 35 | — | 2.6 | 7.6 |
| (39) | 150 | 230 | — | — | — | 1.6 | 5.5 |
| (40) | 200 | 100 | — | 100 | — | 1.6 | 4.0 |
| (41) | 200 | 100 | — | 100 | — | 2.6 | 2.9 |
| (42) | 150 | 230 | — | — | — | 0 | 5.6 |
| (43) | 150 | 230 | — | — | — | 2 | 7.3 |
| (44) | 200 | 100 | — | 100 | 40 | 2 | 2.7 |
| (45) | 150 | 230 | — | — | 38 | 2.45 | 6.7 |
| (46) | 150 | 230 | — | — | 55 | 0.25 | 5.0 |
| (47) | 200 | 100 | — | 100 | 40 | 3.5 | 3.7 |

The invention claimed is:
1. A centrifugal atomized zinc alloy powder for alkaline batteries consisting of either of:
(a) 0.005-2% by weight of indium, and 0.005-0.2% by weight of either one of Al and Bi, or
(b) 0.005-2% by weight of indium, and 0.005-0.2% by weight of Bi, and 0.001-0.5% of either one or both of Al and Ca, or
(c) 0.005-2% by weight of either one or both of Bi and Al, and 0-0.5% by weight of Pb, the remainder being zinc, and characterized in that the centrifugal atomising process is performed in a protective atmosphere, where the oxygen content is between 0.2% and 4% by volume.
2. A centrifugal atomized zinc alloy powder according to claim 1, consisting of either of
(a) 0.01-2% by weight of indium, and 0.01-0.2% by weight of either one of Al and Bi, or
(b) 0.005-2% by weight of indium, and 0.01-0.2% by weight of Bi, and 0.003-0.5% of either one or both of Al and Ca, or
(c) 0.01-2% by weight of either one or both of Bi and Al, and 0-0.5% by weight of Pb, the remainder being zinc.
3. A centrifugal atomized zinc alloy powder in alkaline batteries according to claim 2, characterized in that the oxygen content in the protective atmosphere is between 0.2% and 3.5% by volume.
4. An alkaline battery consisting of an anode, a cathode and an electrolyte, characterized in that the battery uses a centrifugal atomized zinc alloy powder according to claim 1.
5. An alkaline battery according to claim 4, characterized in that the powder comprises metal cemented out of the electrolyte.

6. A process for the manufacturing of a zinc alloy powder for alkaline batteries, comprising the step of centrifugally atomising a zinc alloy consisting either of
   (a) 0.005-2% by weight of indium, and 0.005-0.2% by weight of either one of Al and Bi, or
   (b) 0.005-2% by weight of indium, and 0.005-0.2% by weight of Bi, and 0.001-0.5% of either one or both of Al and Ca, or
   (c) 0.005-2% by weight of either one or both of Bi and Al, and 0-0.5% by weight of Pb, the remainder being zinc, characterized in that the centrifugal atomising process is performed in a protective atmosphere, where the oxygen content is between 0.2% and 4% by volume.

7. A process for the manufacturing of a zinc alloy powder for alkaline batteries, comprising the step of centrifugally atomising a zinc alloy consisting either of
   (a) 0.01-2% by weight of indium, and 0.01-0.2% by weight of either one of Al and Bi, or
   (b) 0.005-2% by weight of indium, and 0.01-0.2% by weight of Bi, and 0.003-0.5% of either one or both of Al and Ca, or
   (c) 0.01-2% by weight of either one or both of Bi and Al, and 0-0.5% by weight of Pb, the remainder being zinc, characterized in that the centrifugal atomising process is performed in a protective atmosphere, where the oxygen content is between 0.2% and 4% by volume.

8. An alkaline battery consisting of an anode, a cathode and an electrolyte, characterized in that the battery uses a centrifugal atomized zinc alloy powder according to claim 2.

9. An alkaline battery consisting of an anode, a cathode and an electrolyte, characterized in that the battery uses a centrifugal atomized zinc alloy powder according to claim 3.

10. A process according to claim 6, characterized in that the oxygen content in the protective atmosphere is between 0.2% and 3.5% by volume.

11. A process according to claim 7 characterized in that the oxygen content in the protective atmosphere is between 0.2% and 3.5% by volume.

* * * * *